Feb. 11, 1930.  M. M. MECKLEM ET AL  1,746,435

LOCK MECHANISM FOR AUTOMOBILES

Filed April 28, 1928

Millard M. Mecklem
Elmer Harrison
Inventors
by John H. Rowen
their atty

Patented Feb. 11, 1930

1,746,435

UNITED STATES PATENT OFFICE

MILLARD M. MECKLEM AND ELMER HARRISON, OF ROCHESTER, PENNSYLVANIA

LOCK MECHANISM FOR AUTOMOBILES

Application filed April 28, 1928. Serial No. 273,755.

Our invention relates to locking devices for use on motor vehicles provided with hydraulic or atmospheric brakes. The object of the invention is to produce a mechanism of this character which is adapted to be locked by key or in any other suitable manner, second; which will prevent the vehicle being stolen, moved, pushed or driven when the locking mechanism has beein applied after setting the brakes. Another object is to produce a safety element in the locking mechanism whereby should the car be inadvertently locked and brakes not applied, which may occur by the activities of meddlesome parties or children, the car can still be driven and the brakes applied as usual. This provision is accomplished by a by-pass check valve in the pressure line, which establishes an open line at all times in the direction of the brakes.

We accomplish these several objects by means of the device hereinafter more specifically described, reference being had to the accompanying drawings forming part hereof in which, Figure 1, is an elevation of an automobile, a portion of the side being broken away showing the mechanism and locking device;

Figure 1:
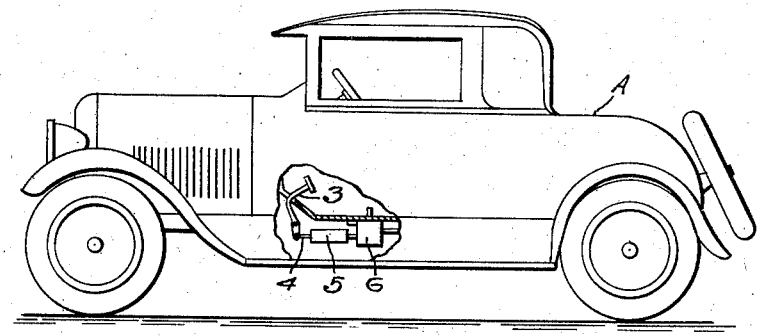
Figure 2:
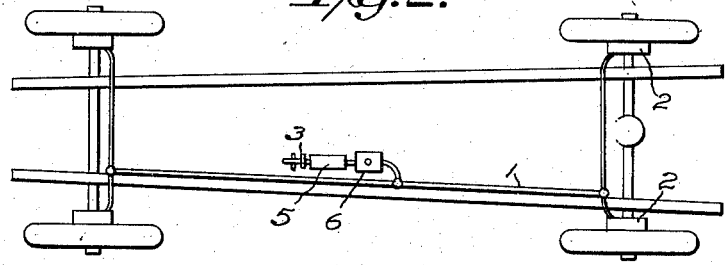
Figure 2, is a plan view of the chassis showing the hydraulic line leading to the brake mechanism and locking device.
Figure 3:
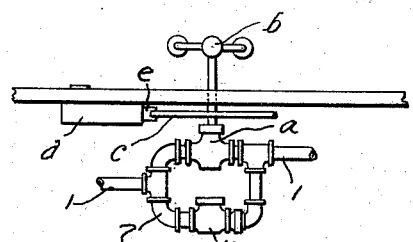
Figure 3, is an elevation of a portion of the hydraulic line showing the by-pass inserted therein.
Figure 4:
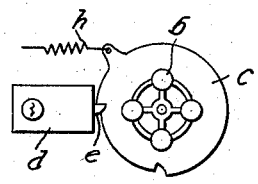
Figure 4, is a plan of the locking device.

Referring to said drawings, A, is an automobile of any usual construction provided with hydraulic or atmospheric brake mechanism; 1, is the pressure line leading to the brakes 2—2; 3 is a foot brake connected to the piston rod 4 of the master cylinder 5; 6, is a locking mechanism inserted in the line between the brakes and the master cylinder; the lock mechanism may be of any suitable construction. In the drawings it consists of a valve $a$, in the pressure line operated by the hand key $b$, which also operates the notched disc $c$, which is rigidly secured upon the stem of the key, and the standard lock $d$, the latch bolt $e$, of which engages in one of the notches in the disc and holds the valve in locked position. The latch bolt of the lock is disengaged by a key whereupon the spring $h$ opens the valve and places the pressure line in normal condition; a safety device comprising a by-pass 7 in the pressure line intermediate the master cylinder and the brakes in which the check valve $k$, is inserted, whereby when in the event of the lock mechanism being applied, and the brakes not set, the brakes can be operated and set through the by-pass notwithstanding; whereas, if the by-pass was not provided, the brakes could not be applied as the pressure line would be closed and accident would probably occur due to the fact that the brakes could not be applied. When the car is driven under such conditions the brakes cannot be released until the driver stops the car and releases the lock mechanism and brakes in the usual manner, the said locking mechanism being preferably enclosed in a theft proof steel case.

Having described our invention, what we claim and desire to secure by Letters Patent is:

1. A locking mechanism inserted in the pressure line intermediate of the brakes and master cylinder comprising a valve and lock mechanism controlling said valve and check valve, and a by-pass around said check valve.

2. In a mechanism of the kind described, the combination of a lock mechanism and a valve inserted in the pressure line between the master cylinder and the brake and a by-pass and check valve inserted in said line around said first mentioned valve.

In testimony whereof, we have hereunto signed our names.

MILLARD M. MECKLEM.
ELMER HARRISON.